(12) United States Patent
Mori et al.

(10) Patent No.: US 6,221,924 B1
(45) Date of Patent: Apr. 24, 2001

(54) BIODEGRADABLE CELLULOSE ACETATE FOAM AND PROCESS FOR ITS PRODUCTION

(75) Inventors: Hiroyuki Mori; Makoto Yoshida; Michikage Matsui, all of Ibaraki; Motoyasu Nakanishi, Shimizu, all of (JP)

(73) Assignees: Teijin Limited, Osaka; Suzuki Sogyo Co., Ltd., Shizuoka, both of (JP)

( * ) Notice: Subject to any disclaimer, the term of this patent is extended or adjusted under 35 U.S.C. 154(b) by 0 days.

(21) Appl. No.: 09/297,265

(22) PCT Filed: Aug. 28, 1998

(86) PCT No.: PCT/JP98/03860

§ 371 Date: Apr. 28, 1999

§ 102(e) Date: Apr. 28, 1999

(87) PCT Pub. No.: WO99/12723

PCT Pub. Date: Mar. 18, 1999

(30) Foreign Application Priority Data

Sep. 5, 1997 (JP) ................................................... 9-240853
Sep. 5, 1997 (JP) ................................................... 9-240856

(51) Int. Cl.$^7$ ....................................................... C08J 9/00
(52) U.S. Cl. ............................... 521/50; 521/82; 521/84.1
(58) Field of Search ................................. 521/50, 82, 84.1

(56) References Cited

U.S. PATENT DOCUMENTS 4,376,752 * 3/1983 Nuckolls et al. ..................... 376/152

FOREIGN PATENT DOCUMENTS

| 657 060 | 4/1965 | (BE) . |
|---|---|---|
| 4-142344 | 5/1992 | (JP) . |
| 6-335919 | 12/1994 | (JP) . |
| 8-59892 | 3/1996 | (JP) . |
| 8-151469 | 6/1996 | (JP) . |
| 10-100264 | 4/1998 | (JP) . |

* cited by examiner

*Primary Examiner*—Nathan M. Nutter
(74) *Attorney, Agent, or Firm*—Sughrue, Mion, Zinn, Macpeak & Seas, PLLC (57) ABSTRACT

A biodegradable cellulose acetate foam with a foam cell size of 0.001–0.8 mm and an apparent density of 0.01–0.27 g/cm$^3$, and a biodegradable cellulose acetate foam wherein the foam is treated with a weak alkali solution, and has an acetylation degree of 45–60% and no acetic acid odor.

15 Claims, 1 Drawing Sheet

BIODEGRADABLE CELLULOSE ACETATE FOAM AND PROCESS FOR ITS PRODUCTION

CROSS-REFERENCE TO RELATED APPLICATION

This application is a 371 of PCT/JP98/03860 filed Aug. 28, 1998, the disclosure of which is incorporated herein by reference.

1. Technical Field

The present invention relates to a biodegradable cellulose acetate foam and to a process for its production. More particularly, the present invention relates to a biodegradable cellulose acetate foam which is suitable for various purposes including heat insulating materials, cushioning materials, food packaging materials, etc. and to a production process by which the foam can be stably obtained.

2. Background Art

Many types of different foams have been produced from synthetic resins in the past, and they have been employed in a wide range of fields including heat insulating materials, cushioning materials, food packaging materials and so forth. In recent years there has been a yearly trend toward increased demand for these synthetic resin foams, which has led to an increased volume of waste year by year, adding to environmental and pollution problems that have been the focus of much attention. However, various efforts have been made toward recycled utilization of discarded synthetic resin foams on a public scale, and with the numerous mounting issues including preventing production of noxious gases by burning disposal and preventing degeneration of heat incinerators by high heat, there is a strong demand for the development of foams which can be easily discarded and disposed of.

In order to meet this demand, various foams have been proposed wherein these synthetic resins (such as polystyrene) are replaced with biodegradable resins. For example, in Japanese Unexamined Patent Publication No. 6-136168, Japanese Examined Patent Publication No. 5-65536, Japanese Unexamined Patent Publication No. 6-335919, Japanese Unexamined Patent Publication No. 8-151469, Japanese Unexamined Patent Publication No. 8-59892, etc. there are disclosed processes for obtaining biodegradable foam molded products comprising starch as the main material. Also, Japanese Unexamined Patent Publication No. 6-15753 discloses a process whereby foam beads comprising pulp as the main material are loaded into a mold and fused together to obtain a molded product. Japanese Unexamined Patent Publication No. 5-320405 discloses a process using foamable woody resin particles prepared by adding a foaming agent to non-solution type chemically modified wood to obtain a molded product mainly by in-mold shaping. Japanese Unexamined Patent Publication No. 6-32928 discloses a process for obtaining a foam sheet from a foamable woody resin prepared by impregnating a non-solution chemically modified wood with a foaming agent, in order to prepare vessel-shaped molded products. Also, Japanese Unexamined Patent Publication No. 8-3357 discloses a process of loading at least a biodegradable resin comprising an acetate or a compound which contains one together with substantial moisture as the starting materials, and after heating and pressurization, suddenly releasing the pressure to make a foam and then molding it into the desired shape with a mold. The foam molded products obtained by these processes, however, have unstable mechanical properties (tensile strength, rupture strength, compressive strength, etc.), hardness and rigidity, and are therefore not always suitable for use as heat insulating materials or cushioning materials.

DISCLOSURE OF INVENTION

The present invention has been accomplished in light of the aforementioned problems of the prior art, and its object is to provide a biodegradable cellulose acetate foam with excellent mechanical properties, and with stable and suitable hardness and rigidity to thus facilitate shaping of various molded products for heat insulating materials, cushioning materials, food packaging materials and the like, as well as a process for its production.

By using cellulose acetate as a biodegradable material in an attempt to overcome the aforementioned problems, the present inventors have found that the object described above can be achieved by producing foams imparted with specific foam properties.

Thus, according to the present invention there is provided a biodegradable cellulose acetate foam with a foam cell size of 0.001–0.8 mm and an apparent density of 0.01–0.27 $g/cm^3$.

The present invention further provides a process for producing a biodegradable cellulose acetate foam, which comprises combining a mixed starting material (D) comprising (A) cellulose acetate, (B) a plasticizer and (C) a foam nucleating agent with a weight ratio of (A):(B):(C) of (100):(0–80):(2–50) with water (E) as the foaming agent at a weight ratio of 2–100 with respect to (D), and after melting the mixture (F) at a temperature of 150–250° C., dispensing it at a temperature of 120–220° C. and then extruding it at a shear rate of 1000–20,000 $sec^{-1}$.

BEST MODE FOR CARRYING OUT THE INVENTION

The foam of the invention employs cellulose acetate as the biodegradable material. The biodegradability of cellulose acetate has been verified by numerous research reports (C. M. Buchanan et al., J. Appl. Polym. Sci., 47, 1709(1993); ibid., 50, 1739(1993); Ji-Dong Gu et al., J. Environ. Polym. Degradation, 1 (2), 143(1993)). The biodegradable cellulose acetate foam of the invention, regardless of its shape, must have foam properties defined by a foam cell size of 0.001–0.8 mm and an apparent density of 0.01–0.27 $g/cm^3$. The foam cell size and apparent density were measured here in the manner described below.

Foam Cell Size

The resulting foam was cut with a razor blade, the cross-section was photographed under magnification with a microscope, and the cell sizes of 10 random points were measured and averaged.

Apparent Density

A strand-shaped foam was cut into a cylinder 1 cm in length and the diameter was measured to determine its volume, which was divided by its weight to determine its density.

Only by satisfying the conditions of a foam cell size of 0.001–0.8 mm and an apparent density of 0.01–0.27 $g/cm^3$, preferably 0.014–0.064 g/cm³, is it possible for the resulting foam to exhibit excellent dynamic properties (tensile strength, rupture strength, compressive strength, etc.) as a foam, as well as hardness and rigidity suitable for cushioning materials, heat insulating materials, packing materials and the like.

The biodegradable cellulose acetate foam of the present invention sometimes has acetic acid liberated from the cellulose acetate still residing in the foam, in which case the foam will exhibit an antibacterial effect.

The amount of liberated acetic acid can be measured in the following manner.

Measurement of Liberated Acetic Acid

A 10 g foam sample is sealed in a 500 cc volume airtight vessel and allowed to stand for 24 hours at a temperature of 20° C., 65% relative humidity, after which the amount of acetic acid in the air of the vessel is measured through a detector tube.

The amount of acetic acid liberated from the cellulose acetate and remaining in the foam is preferably at least 3 ppm by the aforementioned measuring method, in order to obtain an antibacterial effect.

The acetic acid is generated in the foam but, because the foam cells are connected pores, it does not remain inside them but is released to the outside. Also, since the foam cell size is as small as 0.001–0.8 mm as mentioned above, the acetic acid does not exit all at once but is gradually released in suitable amounts for a long-lasting antibacterial effect.

The biodegradable cellulose acetate foam of the invention may be in any form so long as it has the properties described above, but is preferably in the form of particles, a sheet or a molded product prepared therefrom. In the case of a particulate foam, the diameter of the foam particles is 3–200 mm, and the ratio of the total surface area to the surface area of the portion of the foam cells with a foam cell size of 0.1 mm or greater exposed at the surface of the foam particles (exposure ratio) is preferably such as satisfies the following inequality.

Foam cell exposed surface area/total surface area $\leq 1/(2+4\times$ (long axis/short axis))

The exposure ratio was measured in the following manner.

Exposure Ratio

A microscope was used to determine the area of the portion of foam cells with a diameter of at least 0.1 mm which were exposed in a foam particle cut with a cutting device, and this was divided by the total surface area of the foam particle.

If the particle diameter of the particulate foam is smaller than 3 mm, greater labor and cost will be required to form the molded product from the foam, while the resulting molded product will also have inferior cushioning properties. If the particle diameter is greater than 200 mm, it will be more difficult to handle.

If the exposure ratio is greater than the value indicated in the above inequality, a greater proportion of the foam cell will make up the cut sections, thus leading to flaking of fine powder which will often adversely affect the product packaged therewith. The foam particles can be used alone directly or as a cushioning material, heat insulating material or packing material. The foam particles may be packed into a mold of any desired form for shaping; for use as a molded product. There is no particular restriction on the method used for packing in the mold and shaping, and any method may be employed. For example, the foam particles may be shaped by heat fusion, or a binder may be used for adhesion between the foam particles for the shaping. When a binder is used, a solution prepared by dissolving the binder in water, alcohol or another appropriate solvent may be applied to the surface of the foam particles to a degree which does not penetrate the interior, and the solvent then vaporized off to adhere the foam particles together. Alternatively, a heat fusing resin may be applied thereto for adhesion by heat treatment during the shaping. When a solvent is used, water is most preferred for environmental considerations.

Figure 1:
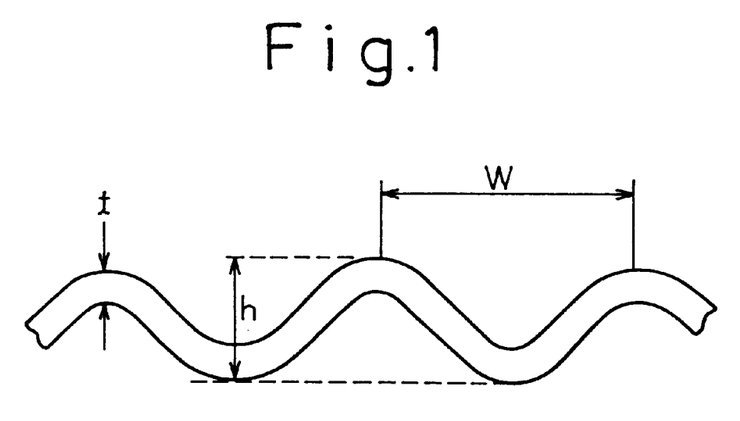
FIG. 1 is a longitudinal cross-sectional sketch showing a magnified view of a portion of a foam sheet according to an embodiment of a foam of the invention.

When the biodegradable cellulose acetate foam of the invention is a sheet-like foam, it is a corrugated foam sheet with a thickness t of 1–50 mm, preferably with a corrugation height h of 2–10 mm and a corrugation width w of 2–10 mm. FIG. 1 is a longitudinal cross-sectional sketch showing a partial magnified view of a corrugated foam sheet. In this drawing, t, h and w are respectively the sheet thickness, and the corrugation height and width.

If the sheet thickness is smaller than 1 mm, greater labor and cost will be required to form the molded product from the foam, while the resulting molded product will also have inferior cushioning properties. If the sheet thickness is greater than 50 mm, it will be more difficult to handle.

When the corrugation height h is smaller than 2 mm, cracks may occur during molding because of insufficient elongation. If it is greater than 10 mm, the gaps will be too large to be absorbed in vacuum molding, and cracks will tend to occur even with press molding because the multiple corrugations will not elongate evenly but will elongate only in certain sections.

When the corrugation spacing is smaller than 2 mm, the bent sections will be weaker, tending to cause cracks during molding. When it is greater than 10 mm there will be fewer corrugations contributing to elongation, and this can also tend to cause cracks.

The shape of the corrugations may be adjusted by appropriate setting of the amount of water added to the starting materials, the amount of resin discharged from the die and the discharge aperture width of the die, and here it is important to use water as the foaming agent. Specifically, latent heat of vaporization of the water causing rapid cooling and hardening of the foam sheet discharged from the die can inhibit spreading of the sheet in the widthwise direction which occurs by foaming, thus forming corrugations. The corrugations which are formed are highly useful for forming sheets. That is, although sheets obtained by extrusion foaming have by themselves insufficient flexibility for formation of deep drawn cup shapes, by forming corrugations it becomes possible to obtain deep drawn cup-shaped molded products provided with the necessary flexibility due to elongation of the corrugations during molding.

Also, this type of corrugated foam sheet is preferably processed with a hot roller in order to obtain a cellulose acetate foam sheet with improved appearance, dimensional stability and tensile strength. The sheet preferably has a thickness of 0.5–25 mm, with longitudinal and lateral tensile strengths of 110–900 g/cm and 30–220 g/cm, respectively. These preferred properties can be achieved by heat treatment of the corrugated foam sheet at a temperature of 100–150° C. under a bearing of 5–40 kgf/cm².

The method of forming the corrugated sheet or non-corrugated sheet described above may be a common method for forming sheets, such as vacuum molding, air pressure molding, press molding or the like, but sheets with corrugations are preferably formed by press molding in consideration of their tendency for air leaks and because of the ease with which air passes through the sheets themselves.

Figure 2:
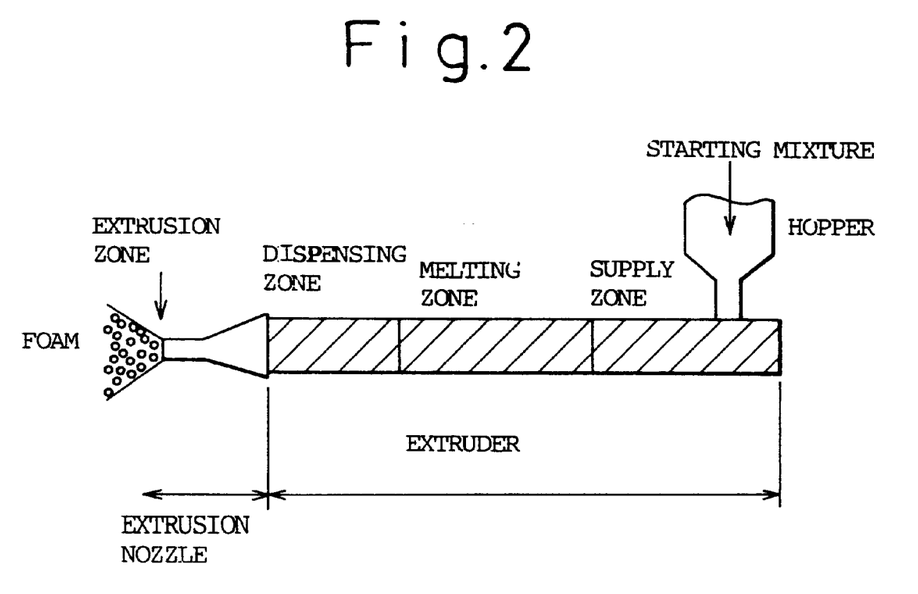
FIG. 2 is a general flow sheet showing the production process for a foam of the invention.

A production process for a cellulose acetate biodegradable foam of the invention will now be described in detail. A general production flow sheet for a foam of the invention is shown in FIG. 2.

The acetic acid esterification degree in the cellulose acetate composing the foam of the invention is preferably at least 45% in terms of acetylation represented by the weight ratio of acetic acid bound to cellulose, with an acetylation of 47–60% being particularly preferred (1.9–2.8 bound acetyl groups per cellulose unit). If the acetylation is less than 45% the melting temperature will become too high, thus making it more difficult to stably accomplish melt molding of foam particles.

The cellulose acetate may contain other substances so long as the object of the invention is not prevented, and such substances may be plasticizers, heat stabilizers, foam nucleating agents, foaming aids and so forth. As plasticizers there may be mentioned polyhydric alcohols such as polyethylene glycol, polymethylene glycol and glycerin; phthalic acid esters such as dimethyl phthalate, diethyl phthalate, dipropyl phthalate, dibutyl phthalate, diamine phthalate and dimethoxyethyl phthalate; phosphoric acid esters such as tributyl phosphate, triphenyl phosphate and tricresyl phosphate; sebacic acid esters such as diethyl sebacate, dibutyl sebacate and dioctyl sebacate; adipic acid esters such as dioctyl adipate, butyloctyl adipate and butylbenzyl adipate; citric acid esters such as tributyl citrate, 2-ethylhexyl citrate, acetyltributyl citrate and acetyltrioctyl citrate; diisobutyl tartrate, butyl stearate, butyl oleate, soybean oil, castor oil, camphor oil, etc., but polyalkylene glycols of molecular weight of 20,000 or lower are particularly preferred for use. When polyalkylene glycols of molecular weight exceeding 20,000 are used it is sometimes impossible to achieve adequate plasticization. These plasticizers may be used alone, or in mixtures of two or more, such as a polyalkylene glycol with glycerin.

When these plasticizers are used, they are preferably added in an amount of no greater than 80 parts by weight, and preferably no greater than 50 parts by weight with respect to the weight of the cellulose acetate. An amount of greater than 80 parts by weight will lead to greater shrinkage after extrusion foaming, which can prevent foaming to the desired density.

As foam nucleating agents there may be added inorganic fine particles such as talc, silicon oxide, titanium oxide, magnesium oxide, aluminum oxide and calcium silicate, or organic fine particles such as cellulose powder, chitin, chitosan, wood flour and stearic acid metal salts. Talc can impart particularly favorable foamability to cellulose acetate, and thus facilitates production of foam particles with uniformity and a high degree of foaming. The foam nucleating agents may be used alone or in mixtures of two or more.

The amount of the foam nucleating agent or foaming aid to be used in the cellulose acetate may be suitable in a range of 2–50 parts by weight, and preferably 5–30 parts by weight, with respect to the cellulose acetate weight. At less than 2 parts by weight the effect of the additives may not be exhibited and, for example, a low amount of the foam nucleating agent may tend to form rough, uneven foam cells; on the other hand, an amount exceeding 50 parts by weight may lead to secondary aggregation of the additives, thus also tending to form rough, uneven foam cells and resulting in reduced foamability due to the lower proportion of cellulose acetate.

The starting materials may be used in the form of a mixture of the cellulose acetate and different additives with water as the foaming agent, or in the form of chips prepared by melt extrusion of a mixture of the cellulose acetate and different additives, for use as starting material chips. In the case of a starting material mixture, the cellulose acetate may be in either flake or powder form, and in the case of flakes it is preferred to set a Dulmage head on the extruder screw or to use a twin-screw extruder for improved kneadability.

For production of a foam from the starting material prepared in this manner, the starting material may be extruded through the nozzle or die of an extruder. Here, the water used as the foaming agent is preferably added at 2–100 parts by weight, and especially 5–50 parts by weight, to 100 parts by weight of the cellulose acetate or the cellulose acetate/additive mixture.

As addition methods there may be mentioned impregnation into the starting material, and injection by a pump through a vent zone between the starting material supply port and the discharge port of the extruder.

According to the invention, if the water is added at less than 2 parts by weight with respect to the starting material the foaming ratio will not increase sufficiently, making it impossible to adequately exhibit the properties of a foam. If added at greater than 100 parts by weight, lumps may be produced during impregnation into the starting material, or bridges may be produced during supply through the hopper port of the extruder, thus making it more difficult to accomplish loading. Also, there will be no significant effect of improved foaming ratio even when the supply is through a vent zone, and instead inconveniences such as unstable discharge will tend to be experienced.

The use of water as the foaming agent is very important for production of a foam according to the invention. Specifically, latent heat of vaporization of the water causing rapid cooling and hardening of the discharged foam can maintain the foam shape without shrinkage.

The extruder used for the melt kneading may be any type of extruder which is capable of heated melt kneading of moisture-added cellulose acetate under high temperature and high pressure, but in most cases a single screw or twin-screw type extruder is used.

According to the invention, the temperature for melt extrusion of the cellulose acetate foam is 150–250° C., and preferably 180–220° C. in the compression zone. If it is lower than 150° C. the cellulose acetate will fail to melt, and if it is above 250° C. the cellulose acetate will tend to undergo carbonization. In the dispensing zone, the temperature is 120–220° C., and preferably 140–200° C. At lower than 120° C. the viscosity of the resin in the extruder will be too high, tending to cause unstable discharge, while acetic acid will not be sufficiently freed from the resulting foam. At higher than 220° C. the resin will be inadequately cooled by the latent heat of vaporization after discharge, resulting in shrinkage and a low foaming ratio of the final foam product.

The shape of the orifice nozzle for extrusion may be triangular, square, rectangular, star-shaped, tubular, etc., and sheet foams can be obtained by extrusion from a film or sheet producing die. The melt kneading time will differ depending on the discharge volume per unit of time, the melt kneading temperature, etc. and therefore cannot be specified in general terms, but it should be a sufficient time for uniform melt kneading of the mixture. The die temperature at the discharge zone may be the same as the above-mentioned melt kneading temperature, or it may be lower than that temperature but within a range allowing discharge.

According to the invention, it is necessary to maintain a discharge shear rate of 1000–20,000 $\sec^{-1}$ in order to achieve a foam cell size in the range of 0.001–0.8 mm. If it is lower than 1000 $\sec^{-1}$ the cell size will exceed 0.8 mm, and if it is higher than 20,000 $\sec^{-1}$ clogging will tend to occur in the discharge port, making it impossible to stably obtain a foam.

According to the invention, when an orifice nozzle is used to make particles from the foam obtained by extrusion foaming, cutting may be accomplished during extrusion from the die section with the orifice, using a foam cutting apparatus equipped with a radially arranged set of flat blades which rotate while their tips contact the die discharge plane, in such a manner that the blade edges are perpendicular to the rotating plane of the set of rotating flat blades.

For production of a foam sheet, the starting material may be extruded from a sheet producing die with an extruder, and the discharge aperture width is preferred to be 0.1–1 mm.

According to the invention, when a corrugated foam sheet is processed with a hot roller, the conditions are preferred to be a temperature of 100–150° C. and a bearing of 5–40 kgf/cm$^2$. If the temperature is lower than 100° C. or the bearing is less than 5 kgf/cm$^2$ the hot roller processing will often result in no effect, and if the temperature is above 150° C. or the bearing is greater than 40 kgf/cm$^2$, the sheet will sometimes fuse with the roller during processing.

For hot roller processing, a plurality of stacked sheets may be processed, contact bonded and used as a single sheet, but the maximum number of sheets that can be stacked is ten. If more than ten sheets are stacked, the heat will not be sufficiently transmitted to the interior during the processing, making contact bonding of the sheets impossible. The processing speed is not particularly restricted, but from the standpoint of operation and ease of handling the sheets after their heat processing, it should be 1–10 m/min, and preferably 2–5 m/min.

Incidentally, as already mentioned above, the biodegradable cellulose acetate foam of the invention will sometimes have acetyl groups liberated from the molecules as acetic acid. This free acetic acid imparts an antibacterial property to the foam and is preferred from this viewpoint, but depending on the purpose of use the acetic acid odor may not only be unpleasant to the consumer, but can become a cause of rust when it is placed in a sealed container with metal or the like.

The present invention therefore further provides a biodegradable cellulose acetate foam which is the aforementioned biodegradable cellulose acetate foam of the invention wherein the foam is treated with a weak alkali solution, for an acetylation degree of 45–60% and no acetic acid odor.

In other words, it provides the biodegradable cellulose acetate foam of the invention wherein the foam is treated with a weak alkali solution to give a foam with an acetylation degree of 45–60% while exhibiting no acetic acid odor. Here, the weak alkali solution treatment serves to reduce acetic acid liberated from the cellulose acetate, which is present in the resulting foam and its molded products.

The acetic acid odor can be determined by quantitation of the acetic acid content by the method described above. In this measuring method, "odorless" was defined as an acetic acid content of less than 3 ppm liberated from the cellulose acetate and residing in the foam.

The weak alkali treatment according to the invention is preferably at a pH of 7.5–8.5. If the pH is lower than 7.5 it will not be possible to sufficiently neutralize the liberated acetic acid, often preventing reduction of odor. If the pH is over 8.5, the cellulose acetate will be saponified by the alkali treatment, resulting in an acetylation degree of less than 45% which will sometimes cause shrinkage and hardening of the foam. The weak alkali may be any one with a pH of 7.5–8.5, and as examples there may be mentioned aqueous solutions of sodium bicarbonate, potassium bicarbonate, sodium carbonate, potassium carbonate, calcium carbonate, sodium hydroxide and potassium hydroxide.

The amount of the weak alkali solution used for treatment is preferably 20–100 parts by weight with respect to the foam. If the treatment amount is less than 20 wt % it will not be possible to sufficiently neutralize the liberated acetic acid, often preventing reduction of odor. If it is over 100 wt %, the cellulose acetate will be saponified by the alkali treatment, resulting in an acetylation degree of less than 45% which will sometimes cause shrinkage and hardening of the foam.

The method of weak alkali treatment according to the invention may be the same as a common solution treatment, examples including a method of placing the foam in a vat containing the weak alkali solution, and a method whereby the weak alkali aqueous solution is showered or sprayed onto the foam or its molded product. Methods involving spraying of the weak alkali solution immediately after discharge from the extruder in the foam production process are effective from the standpoint of quantitation and working efficiency.

The present invention will now be further explained by way of examples. The properties evaluated in the examples were measured by the following methods.

Apparent Density

A strand-shaped foam was cut into a cylinder 1 cm in length and the diameter was measured to determine its volume, which was divided by its weight to determine its density.

Foam Cell Size

The resulting foam was cut with a razor blade, the cross-section was photographed, under magnification with a microscope, and the cell sizes of 10 random points were measured and averaged.

Acetic Acid Content

A 10 g foam sample was sealed in a 500 cc volume airtight vessel and allowed to stand for 24 hours at a temperature of 20° C., and a relative humidity of 65%, after which the amount of acetic acid in the air of the vessel was measured through a detector tube.

Exposure Ratio

A microscope was used to determine the area of the portion of foam cells with a diameter of at least 0.1 mm which were exposed in a foam particle cut with a cutting device, and this was divided by the total surface area of the foam particle.

Foaming Ratio

The resulting sheet was cut into a 5-cm square piece, its thickness and weight were measured to calculate its density, and this was divided by the density of the starting material to obtain the foaming ratio value.

Moldability

A frame with a diameter of 5 cm and a depth of 10 cm was used for press molding of a foam sheet which had been preheated in an atmosphere at 100° C. Repeating the same test 30 times, cases with less than 20% cracking were indicated with "O" those with 20% up to 50% were indicated with "Δ" and those with at least 50% were indicate with "X".

EXAMPLES 1–25 AND COMPARATIVE
EXAMPLES 1–11

Cellulose acetate (Acetate Flakes, product of Teijin) was combined with polyethylene glycol (PEG, product of Nihon Yushi), talc (LMR-200, product of Fuji Talc Kogyo) and water in the proportions listed in Table 1, and a twin-screw extruder (BT-30-S2, product of Plastic Kogaku Kenkyusho) was used for melting and kneading of the mixture, and extrusion from a nozzle with a 1.5 mm aperture. A cutting apparatus was situated at the nozzle discharge port for cutting of the discharged foam to obtain a particulate foam.

The cutting apparatus had 36 spring steel blades of 0.3 mm thickness set at equal pitch in a holder, with rotation at 1800 rpm in such a manner that the tip traced a path of 220 mmΦ. The obtained results are summarized in Table 1.

TABLE 1

| | Composition (pts. by wt.) | | | | | Temperature conditions | |
|---|---|---|---|---|---|---|---|
| | | | Foam | | | | |
| | Cellulose acetate | Plasticizer (PEG) | nucleating agent (talc) | water | PEG Molecular weight | Compression zone (° C.) | Dispensing zone (° C.) |
| Comp. Ex. 1 | 100 | 20 | 0$^x$ | 20 | 400 | 210 | 190 |
| Example 1 | 100 | 20 | 2 | 20 | 400 | 210 | 190 |
| Example 2x | 100 | 20 | 50 | 20 | 400 | 210 | 190 |
| Comp. Ex. 2 | 100 | 20 | 55$^x$ | 20 | 400 | 210 | 190 |
| Example 3 | 100 | 0 | 10 | 20 | 400 | 210 | 190 |
| Example 4 | 100 | 20 | 10 | 20 | 400 | 210 | 190 |
| Example 5 | 100 | 40 | 10 | 20 | 400 | 210 | 190 |
| Example 6 | 100 | 60 | 10 | 20 | 400 | 210 | 190 |
| Example 7 | 100 | 80 | 10 | 20 | 400 | 210 | 190 |
| Comp. Ex. 3 | 100 | 90$^x$ | 10 | 20 | 400 | 210 | 190 |
| Comp. Ex. 4 | 100 | 20 | 10 | 0$^x$ | 400 | 210 | 190 |
| Example 8 | 100 | 20 | 10 | 2 | 400 | 210 | 190 |
| Example 9 | 100 | 20 | 10 | 40 | 400 | 210 | 190 |
| Example 10 | 100 | 20 | 10 | 80 | 400 | 210 | 190 |
| Example 11 | 100 | 20 | 10 | 100 | 400 | 210 | 190 |
| Comp. Ex. 5 | 100 | 20 | 10 | 110$^x$ | 400 | 210 | 190 |
| Example 12 | 100 | 20 | 10 | 20 | 1000 | 210 | 190 |
| Example 13 | 100 | 20 | 10 | 20 | 5000 | 210 | 190 |
| Example 14 | 100 | 20 | 10 | 20 | 10000 | 210 | 190 |
| Example 15 | 100 | 20 | 10 | 20 | 15000 | 210 | 190 |
| Example 16 | 100 | 20 | 10 | 20 | 20000 | 210 | 190 |
| Example 17 | 100 | 20 | 10 | 20 | 22000 | 210 | 190 |
| Comp. Ex. 6 | 100 | 20 | 10 | 20 | 400 | 140$^x$ | 190 |
| Example 18 | 100 | 20 | 10 | 20 | 400 | 150 | 190 |
| Example 19 | 100 | 20 | 10 | 20 | 400 | 250 | 190 |
| Comp. Ex. 7 | 100 | 20 | 10 | 20 | 400 | 260$^x$ | 190 |
| Comp. Ex. 8 | 100 | 20 | 10 | 20 | 400 | 210 | 110$^x$ |
| Example 20 | 100 | 20 | 10 | 20 | 400 | 210 | 120 |
| Example 21 | 100 | 20 | 10 | 20 | 400 | 210 | 220 |
| Comp. Ex. 9 | 100 | 20 | 10 | 20 | 400 | 210 | 230$^x$ |
| Comp. Ex. 10 | 100 | 20 | 10 | 20 | 400 | 210 | 190 |
| Example 22 | 100 | 20 | 10 | 20 | 400 | 210 | 190 |
| Example 23 | 100 | 20 | 10 | 20 | 400 | 210 | 190 |
| Example 24 | 100 | 20 | 10 | 20 | 400 | 210 | 190 |
| Example 25 | 100 | 20 | 10 | 20 | 400 | 210 | 190 |
| Comp. Ex. 11 | 100 | 20 | 10 | 20 | 400 | 210 | 190 |

| | Discharge volume (kg/hr) | Shear rate (sec$^{-1}$) | Foaming ratio (times) | Apparent density (g/cm$^3$) | Foam cell size (mm) | Exposure ratio (%) | Acetic acid content (ppm) |
|---|---|---|---|---|---|---|---|
| Comp. Ex. 1 | 12.9 | 8000 | 31 | 0.043 | 2.0$^x$ | 0.02 | 10 |
| Example 1 | 13.0 | 8100 | 31 | 0.044 | 0.8 | 0.01 | 12 |
| Example 2x | 12.4 | 7700 | 17 | 0.080 | 0.7 | 0 | 13 |
| Comp. Ex. 2 | 12.7 | 7900 | 10 | 0.130 | 1.2$^x$ | 0.01 | 9 |
| Example 3 | 12.9 | 8000 | 35 | 0.039 | 0.5 | 0 | 8 |
| Example 4 | 12.9 | 8000 | 39 | 0.035 | 0.3 | 0 | 5 |
| Example 5 | 12.7 | 7900 | 36 | 0.037 | 0.4 | 0 | 3 |
| Example 6 | 13.0 | 8100 | 14 | 0.100 | 0.2 | 0 | 4 |
| Example 7 | 12.7 | 7900 | 11 | 0.120 | 0.2 | 0 | 6 |
| Comp. Ex. 3 | 12.5 | 7800 | 10 | 0.28$^x$ | 0.3 | 0 | 5 |
| Comp. Ex. 4 | 12.5 | 7800 | 3 | 0.520$^x$ | 0.2 | 0.01 | 3 |
| Example 8 | 12.9 | 8000 | 11 | 0.120 | 0.3 | 0 | 5 |
| Example 9 | 13.0 | 8100 | 34 | 0.040 | 0.2 | 0 | 6 |
| Example 10 | 12.9 | 8000 | 35 | 0.039 | 0.3 | 0 | 7 |
| Example 11 | 12.7 | 7900 | 38 | 0.036 | 0.3 | 0 | 10 |
| Comp. Ex. 5 | | | Discharge impossible | | | | |
| Example 12 | 12.7 | 7900 | 35 | 0.039 | 0.3 | 0 | 9 |
| Example 13 | 12.5 | 7800 | 34 | 0.040 | 0.4 | 0 | 5 |
| Example 14 | 13.0 | 8100 | 35 | 0.039 | 0.3 | 0.01 | 7 |
| Example 15 | 12.7 | 7900 | 40 | 0.034 | 0.4 | 0 | 9 |
| Example 16 | 12.9 | 8000 | 36 | 0.037 | 0.3 | 0 | 10 |

TABLE 1-continued

| | | | | | | | |
|---|---|---|---|---|---|---|---|
| Example 17 | 12.7 | 7900 | 36 | 0.037 | 0.3 (large variance) | 0 | 9 |
| Comp. Ex. 6 | | | | Discharge impossible | | | |
| Example 18 | 13.0 | 8100 | 34 | 0.040 | 0.3 | 0 | 7 |
| Example 19 | 12.9 | 8000 | 33 | 0.041 | 0.2 | 0 | 10 |
| Comp. Ex. 7 | | | | Carbonization | | | |
| Comp. Ex. 8 | 4.8–11.3 (unstable discharge) | 3000–7000 | 11–30 | 0.045–0.120 | 0.3 | 0 | 1 |
| Example 20 | 13.0 | 6100 | 30 | 0.045 | 0.2 | 0 | 3 |
| Example 21 | 13.2 | 8200 | 14 | 0.100 | 0.2 | 0 | 12 |
| Comp. Ex. 9 | 12.7 | 7900 | 8 | $0.29^x$ | 0.3 | 0 | 11 |
| Comp. Ex. 10 | 0.8 | $500^x$ | 14 | 0.095 | $0.9^x$ | 0 | 10 |
| Example 22 | 1.6 | 1000 | 19 | 0.070 | 0.8 | 0 | 10 |
| Example 23 | 8.0 | 5000 | 30 | 0.045 | 0.4 | 0 | 7 |
| Example 24 | 24.1 | 15000 | 39 | 0.035 | 0.3 | 0 | 5 |
| Example 25 | 32.2 | 20000 | 39 | 0.035 | 0.3 | 0 | 7 |
| Comp. Ex. 11 | 33.8 | $21000^x$ | | Unstable discharge | | | |

Note: The "x" superscripts in Table 1 indicate values outside the scope the invention.
Examples 26–32 and Comparative Examples 12–17
The cellulose acetate, polyethylene glycol and talc of Example 4 were combined with water in the proportions listed in Table 2, and a twin-screw extruder (0TE57-11, product of Osaka Seiki Kosaku) was used for melting and plasticizing at 210° C. and extrusion from a 500-mm wide die at 200° C. to obtain foam sheets. The moldability of each of the resulting foam sheets was evaluated. The results are summarized in Table 2.

TABLE 2

| | Composition (pts. by wt.) | | | | Discharge volume (kg/hr) | Die discharge aperture width (mm) | Shear rate ($\sec^{-1}$) |
|---|---|---|---|---|---|---|---|
| | Cellulose acetate | Plasticizer (PEG) | Foam nucleating agent (talc) | Water | | | |
| Comp. Ex. 12 | 100 | 0 | $0^B$ | 20 | 300 | 0.3 | 8200 |
| Comp. Ex. 13 | 100 | 50 | $0^x$ | 20 | 300 | 0.3 | 8200 |
| Example 26 | 100 | 50 | 15 | 20 | 300 | 0.3 | 8200 |
| Comp. Ex. 14 | 100 | 50 | 20 | $1^x$ | 300 | 0.3 | 8200 |
| Example 27 | 100 | 50 | 20 | 2 | 300 | 0.3 | 8200 |
| Example 28 | 100 | 50 | 20 | 20 | 300 | 0.3 | 8200 |
| Example 29 | 100 | 50 | 20 | 50 | 300 | 0.3 | 8200 |
| Comp. Ex. 15 | 100 | 50 | 20 | $105^x$ | 300 | 0.3 | |
| Comp. Ex. 16 | 100 | 50 | 20 | 20 | 55 | 0.3 | $917^x$ |
| Example 30 | 100 | 50 | 20 | 20 | 70 | 0.3 | 1170 |
| Example 31 | 100 | 50 | 20 | 20 | 320 | 0.2 | 19700 |
| Comp. Ex. 17 | 100 | 50 | 20 | 20 | 340 | 0.2 | $21000^x$ |
| Example 32 | 100 | 50 | 20 | 20 | 450 | 0.5 | 4400 |

| | Foaming ratio (times) | Apparent density (g/cm³) | Foam cell size (mm) | Acetic acid content (ppm) | Thickness (mm) | Corrugation height (h) (ppm) | Corrugation width (w) (mm) | Moldability |
|---|---|---|---|---|---|---|---|---|
| Comp. Ex. 12 | 30 | 0.045 | $1.4^x$ | 7 | 4 | 3 | 3 | ○ |
| Comp. Ex. 13 | 32 | 0.042 | $1.5^x$ | 5 | 4 | 3 | 3 | ○ |
| Example 26 | 40 | 0.034 | 0.3 | 5 | 5 | 3 | 3 | ○ |
| Comp. Ex. 14 | 7 | $0.293^x$ | 0.2 | 2 | 2 | 1 | 1 | Δ |
| Example 27 | 15 | 0.090 | 0.3 | 3 | 3 | 2 | 2 | ○ |
| Example 28 | 38 | 0.036 | 0.3 | 6 | 5 | 4 | 3 | ○ |
| Example 29 | 40 | 0.034 | 0.5 | 10 | 6 | 5 | 6 | ○ |
| Comp. Ex. 15 | | | Discharge impossible (back flow) | | | | | |
| Comp. Ex. 16 | 10 | $0.285^x$ | 0.2 | 3 | 2 | 1 | 2 | Δ |
| Example 30 | 15 | 0.090 | 0.3 | 4 | 3 | 2 | 2 | ○ |
| Example 31 | 58 | 0.023 | 0.3 | 5 | 5 | 4 | 4 | ○ |
| Comp. Ex. 17 | | | Unstable discharge | | | | | |
| Example 32 | 40 | 0.034 | 0.6 | 6 | 12 | 11 | 11 | Δ |

Note: The "x" superscripts in Table 2 indicate values outside the scope the invention.
Examples 33–46
The cellulose acetate foam sheet of Example 28 was compressed with a 150 mmφ metal roller bearing a 120-μm deep 40 mesh square dot pattern and an NBR roller with a hardness of A75, to obtain a high-strength foam sheet. The results are summarized in Table 3.

TABLE 3

| | Stacked sheets (no.) | Weight (g/m²) | Hot roller conditions Temperature (° C.) | Bearing (kgf/cm²) | Strength (g/cm) Length | Width | Surface shape (corru-gations) |
|---|---|---|---|---|---|---|---|
| Example 28 | 1 | 200 | Hot roller | No processing | 200 | 70 | Yes |
| Example 33 | 1 | 200 | 100 | 20 | 270 | 85 | No |
| Example 34 | 1 | 200 | 130 | 20 | 280 | 90 | No |
| Example 35 | 1 | 200 | 150 | 20 | 280 | 90 | No |
| Example 36 | 1 | 200 | 130 | 5 | 230 | 80 | No |
| Example 37 | 1 | 200 | 130 | 10 | 270 | 85 | No |
| Example 38 | 1 | 200 | 130 | 30 | 280 | 90 | No |
| Example 39 | 1 | 200 | 130 | 40 | 280 | 90 | No |
| Example 40 | 1 | 50 | 130 | 20 | 110 | 30 | No |
| Example 41 | 1 | 300 | 130 | 20 | 800 | 170 | No |
| Example 42 | 1 | 400 | 130 | 20 | 900 | 220 | No |
| Example 43 | 2 | 300 | 130 | 20 | 850 | 170 | No |
| Example 44 | 5 | 350 | 130 | 20 | 860 | 180 | No |
| Example 45 | 10 | 400 | 130 | 20 | 890 | 220 | No |
| Example 46 | 11 | 450 | 130 | 20 | No compression | | |

EXAMPLES 47–71 AND COMPARATIVE EXAMPLES 18–28

Cellulose acetate (Acetate Flex, product of Teijin) was combined with polyethylene glycol (PEG, product of Nihon Yushi), talc (LMR-200, product of Fuji Talc Kogyo) and water in the proportions listed in Table 4, and a twin-screw extruder (BT-30-S2, product of Plastic Kogaku Kenkyusho) was used for melting and kneading of the mixture, and extrusion from a nozzle with a 1.5 mm aperture. A cutting apparatus was situated at the nozzle discharge port for cutting of the discharged foam to obtain a particle foam. The cutting apparatus had 36 spring steel blades of 0.3 mm thickness set at equal pitch in a holder, with rotation at 1800 rpm in such a manner that the tip traced a path of 220 mmΦ. An aqueous sodium bicarbonate solution (pH 8.0) was added to the resulting particle foam at 60 PHR, and the acetic acid content was measured at a temperature of 20° C. The obtained results are summarized in Table 4.

TABLE 4

| | Composition (pts. by wt.) | | | | | Temperature conditions | |
|---|---|---|---|---|---|---|---|
| | | | Foam | | | | |
| | Cellulose acetate | Plasticizer (PEG) | nucleating agent (talc) | water | PEG Molecular weight | Compression zone (° C.) | Dispensing zone (° C.) |
| Comp. Ex. 18 | 100 | 20 | 0ˣ | 20 | 400 | 210 | 190 |
| Example 47 | 100 | 20 | 2 | 20 | 400 | 210 | 190 |
| Example 48 | 100 | 20 | 50 | 20 | 400 | 210 | 190 |
| Comp. Ex. 19 | 100 | 20 | 55ˣ | 20 | 400 | 210 | 190 |
| Example 49 | 100 | 0 | 10 | 20 | 400 | 210 | 190 |
| Example 50 | 100 | 20 | 10 | 20 | 400 | 210 | 190 |
| Example 51 | 100 | 40 | 10 | 20 | 400 | 210 | 190 |
| Example 52 | 100 | 60 | 10 | 20 | 400 | 210 | 190 |
| Example 53 | 100 | 80 | 10 | 20 | 400 | 210 | 190 |
| Comp. Ex. 20 | 100 | 90ˣ | 10 | 20 | 400 | 210 | 190 |
| Comp. Ex. 21 | 100 | 20 | 10 | 0ˣ | 400 | 210 | 190 |
| Example 54 | 100 | 20 | 10 | 2 | 400 | 210 | 190 |
| Example 55 | 100 | 20 | 10 | 40 | 400 | 210 | 190 |
| Example 56 | 100 | 20 | 10 | 80 | 400 | 210 | 190 |
| Example 57 | 100 | 20 | 10 | 100 | 400 | 210 | 190 |
| Comp. Ex. 22 | 100 | 20 | 10 | 110ˣ | 400 | 210 | 190 |
| Example 58 | 100 | 20 | 10 | 20 | 1000 | 210 | 190 |
| Example 59 | 100 | 20 | 10 | 20 | 5000 | 210 | 190 |
| Example 60 | 100 | 20 | 10 | 20 | 10000 | 210 | 190 |
| Example 61 | 100 | 20 | 10 | 20 | 15000 | 210 | 190 |
| Example 62 | 100 | 20 | 10 | 20 | 20000 | 210 | 190 |
| Example 63 | 100 | 20 | 10 | 20 | 22000 | 210 | 190 |
| Comp. Ex. 23 | 100 | 20 | 10 | 20 | 400 | 140ˣ | 190 |
| Example 64 | 100 | 20 | 10 | 20 | 400 | 150 | 190 |
| Example 65 | 100 | 20 | 10 | 20 | 400 | 250 | 190 |
| Comp. Ex. 24 | 100 | 20 | 10 | 20 | 400 | 260ˣ | 190 |
| Comp. Ex. 25 | 100 | 20 | 10 | 20 | 400 | 210 | 110ˣ |
| Example 66 | 100 | 20 | 10 | 20 | 400 | 210 | 120 |
| Example 67 | 100 | 20 | 10 | 20 | 400 | 210 | 220 |

TABLE 4-continued

| | | | | | | | |
|---|---|---|---|---|---|---|---|
| Comp. Ex. 26 | 100 | 20 | 10 | 20 | 400 | 210 | 230[x] |
| Comp. Ex. 27 | 100 | 20 | 10 | 20 | 400 | 210 | 190 |
| Example 68 | 100 | 20 | 10 | 20 | 400 | 210 | 190 |
| Example 69 | 100 | 20 | 10 | 20 | 400 | 210 | 190 |
| Example 70 | 100 | 20 | 10 | 20 | 400 | 210 | 190 |
| Example 71 | 100 | 20 | 10 | 20 | 400 | 210 | 190 |
| Comp. Ex. 28 | 100 | 20 | 10 | 20 | 400 | 210 | 190 |

| | Discharge volume (kg/hr) | Shear rate (sec$^{-1}$) | Foaming ratio (times) | Apparent density (g/cm$^3$) | Foam cell size (mm) | Exposure ratio (%) | Acetic acid content (ppm) |
|---|---|---|---|---|---|---|---|
| Comp. Ex. 18 | 12.9 | 8000 | 31 | 0.043 | 2.0[x] | 0.02 | 1 |
| Example 47 | 13.0 | 8100 | 31 | 0.044 | 0.8 | 0.01 | 1 |
| Example 48 | 12.4 | 7700 | 17 | 0.080 | 0.7 | 0 | 2 |
| Comp. Ex. 19 | 12.7 | 7900 | 10 | 0.130[x] | 1.2[x] | 0.01 | 0 |
| Example 49 | 12.9 | 8000 | 35 | 0.039 | 0.5 | 0 | 2 |
| Example 50 | 12.9 | 8000 | 39 | 0.035 | 0.3 | 0 | 0 |
| Example 51 | 12.7 | 7900 | 36 | 0.037 | 0.4 | 0 | 0 |
| Example 52 | 13.0 | 8100 | 14 | 0.100 | 0.2 | 0 | 0 |
| Example 53 | 12.7 | 7900 | 11 | 0.120 | 0.2 | 0 | 0 |
| Comp. Ex. 20 | 12.5 | 7800 | 10 | 0.130[x] | 0.2 | 0 | 0 |
| Comp. Ex. 21 | 12.5 | 7800 | 3 | 0.520[x] | 0.2 | 0.01 | 0 |
| Example 54 | 12.9 | 8000 | 11 | 0.120 | 0.3 | 0 | 0 |
| Example 55 | 13.0 | 8100 | 34 | 0.040 | 0.2 | 0 | 1 |
| Example 56 | 12.9 | 8000 | 35 | 0.039 | 0.3 | 0 | 1 |
| Example 57 | 12.7 | 7900 | 38 | 0.036 | 0.3 | 0 | 2 |
| Comp. Ex. 22 | | | Discharge impossible | | | | |
| Example 58 | 12.7 | 7900 | 35 | 0.039 | 0.3 | 0 | 0 |
| Example 59 | 12.5 | 7800 | 34 | 0.040 | 0.4 | 0 | 0 |
| Example 60 | 13.0 | 8100 | 35 | 0.039 | 0.3 | 0.01 | 0 |
| Example 61 | 12.7 | 7900 | 40 | 0.034 | 0.4 | 0 | 1 |
| Example 62 | 12.9 | 8000 | 36 | 0.037 | 0.3 | 0 | 2 |
| Example 63 | 12.7 | 7900 | 36 | 0.037 | 0.3 (large variation) | 0 | 1 |
| Comp. Ex. 23 | | | Discharge impossible | | | | |
| Example 64 | 13.0 | 8100 | 34 | 0.040 | 0.3 | 0 | 0 |
| Example 65 | 12.9 | 8000 | 33 | 0.041 | 0.2 | 0 | 1 |
| Comp. Ex. 24 | | | Carbonization | | | | |
| Comp. Ex. 25 | 4.8–11.3 (unstable discharge) | 3000–7000 | 11–30 | 0.045–0.120 | 0.3 | 0 | 0 |
| Example 66 | 13.0 | 8100 | 30 | 0.045 | 0.2 | 0 | 0 |
| Example 67 | 13.2 | 8200 | 14 | 0.100 | 0.2 | 0 | 2 |
| Comp. Ex. 26 | 12.7 | 7900 | 10 | 0.135[x] | 0.2 | 0 | 2 |
| Comp. Ex. 27 | 0.8 | 500[x] | 14 | 0.095 | 0.9[x] | 0 | 1 |
| Example 68 | 1.6 | 1000 | 19 | 0.070 | 0.8 | 0 | 1 |
| Example 69 | 8.0 | 5000 | 30 | 0.045 | 0.4 | 0 | 0 |
| Example 70 | 24.1 | 15000 | 39 | 0.035 | 0.3 | 0 | 0 |
| Example 71 | 32.2 | 20000 | 39 | 0.085 | 0.3 | 0 | 0 |
| Comp. Ex. 28 | 33.8 | 21000[x] | | Unstable discharge | | | |

Note:
The "x" superscripts in Table 4 indicate values outside the scope the invention.

Examples 72–78 and Comparative Examples 29–34

The cellulose acetate, polyethylene glycol and talc of Example 50 were combined with water in the proportions listed in Table 5, and a twin-screw extruder (OTE57-11, product of Osaka Seiki Kosaku) was used for melting and plasticizing of the mixtures at 210° C. and extrusion from a 500-mm wide die at 200° C. to obtain foam sheets. An aqueous sodium bicarbonate solution (pH 8.0) was added to the resulting foam sheet at 60 PHR, and the acetic acid content was measured at a temperature of 20° C. The moldability of each sheet after this weak alkali treatment was also evaluated. The results are summarized in Table 5.

TABLE 5

| | Composition (pts. by wt.) | | | | Discharge volume (kg/hr) | Die discharge aperture width (mm) | Shear rate (sec$^{-1}$) |
|---|---|---|---|---|---|---|---|
| | Cellulose acetate | Plasticizer (PEG) | Foam nucleating agent (talc) | Water | | | |
| Comp. Ex. 29 | 100 | 0 | 0[x] | 20 | 300 | 0.3 | 8200 |
| Comp. Ex. 30 | 100 | 50 | 0[x] | 20 | 300 | 0.3 | 8200 |
| Example 72 | 100 | 50 | 15 | 20 | 300 | 0.3 | 8200 |

TABLE 5-continued

| | | | | | | | |
|---|---|---|---|---|---|---|---|
| Comp. Ex. 31 | 100 | 50 | 20 | 1x | 300 | 0.3 | 8200 |
| Example 73 | 100 | 50 | 20 | 2 | 300 | 0.3 | 8200 |
| Example 74 | 100 | 50 | 20 | 20 | 300 | 0.3 | 8200 |
| Example 75 | 100 | 50 | 20 | 50 | 300 | 0.3 | 8200 |
| Comp. Ex. 32 | 100 | 50 | 20 | 105B | 300 | 0.3 | |
| Comp. Ex. 33 | 100 | 50 | 20 | 20 | 55 | 0.3 | 917x |
| Example 76 | 100 | 50 | 20 | 20 | 70 | 0.3 | 1170 |
| Example 77 | 100 | 50 | 20 | 20 | 320 | 0.2 | 19700 |
| Comp. Ex. 34 | 100 | 50 | 20 | 20 | 340 | 0.2 | 21000x |
| Example 78 | 100 | 50 | 20 | 20 | 450 | 0.5 | 4400 |

| | Foaming ratio (times) | Apparent density (g/cm³) | Foam cell size (mm) | Acetic acid content (ppm) | Thickness (mm) | Corrugation height (h) (ppm) | Corrugation width (w) (mm) | Moldability |
|---|---|---|---|---|---|---|---|---|
| Comp. Ex. 29 | 30 | 0.045 | 1.4x | 1 | 4 | 3 | 3 | ○ |
| Comp. Ex. 30 | 32 | 0.042 | 1.5x | 0 | 4 | 3 | 3 | ○ |
| Example 72 | 40 | 0.034 | 0.3 | 0 | 5 | 3 | 3 | ○ |
| Comp. Ex. 31 | 7 | 0.193x | 0.2 | 0 | 2 | 1 | 1 | Δ |
| Example 73 | 15 | 0.090 | 0.3 | 0 | 3 | 2 | 2 | ○ |
| Example 74 | 38 | 0.036 | 0.3 | 0 | 5 | 4 | 3 | ○ |
| Example 75 | 40 | 0.034 | 0.5 | 2 | 6 | 5 | 6 | ○ |
| Comp. Ex. 32 | | | Discharge impossible (back flow) | | | | | |
| Comp. Ex. 33 | 10 | 0.135x | 0.2 | 0 | 2 | 1 | 2 | Δ |
| Example 76 | 15 | 0.090 | 0.3 | 0 | 3 | 2 | 2 | ○ |
| Example 77 | 58 | 0.023 | 0.3 | 0 | 5 | 4 | 4 | ○ |
| Comp. Ex. 34 | | | Unstable discharge | | | | | |
| Example 78 | 40 | 0.034 | 0.6 | 0 | 12 | 11 | 11 | Δ |

Note:
The "x" superscripts in Table 5 indicate values outside the scope the invention.

Examples 79–86

The foamed particles of Example 50 were treated with sodium bicarbonate and sodium hydroxide in the pH concentrations and treatment amounts listed in Table 6, and the acetic acid contents of the treated particles were measured at temperatures of 20, 40 and 60° C. The outer appearances of these foamed particles were also observed visually, and the shrinkage and hardening were evaluated. The results are summarized in Table 6.

TABLE 6

| | Alkali type | pH | Alkali solution treatment amount (RHR) | Temperature (° C.) | Acetic acid concentration (ppm) | Foam condition |
|---|---|---|---|---|---|---|
| Example 79 | Sodium bicarbonate | 7.5 | 60 | 20 | 3 | No change |
| Example 80 | Sodium bicarbonate | 8.0 | 60 | 20 | 0 | No change |
| Example 81 | Sodium hydroxide | 8.5 | 60 | 20 | 0 | No change |
| Example 82 | Sodium bicarbonate | 8.0 | 20 | 20 | 3 | No change |
| Example 83 | Sodium bicarbonate | 8.0 | 80 | 20 | 0 | No change |
| Example 84 | Sodium bicarbonate | 8.0 | 100 | 20 | 0 | No change |
| Example 85 | Sodium bicarbonate | 7.5 | 60 | 40 | 3 | No change |
| Example 86 | Sodium bicarbonate | 8.0 | 60 | 40 | 0 | No change |
| Example 87 | Sodium hydroxide | 8.5 | 60 | 40 | 0 | No change |
| Example 88 | Sodium bicarbonate | 8.0 | 20 | 40 | 3 | No change |
| Example 89 | Sodium bicarbonate | 8.0 | 80 | 40 | 0 | No change |
| Example 90 | Sodium bicarbonate | 8.0 | 100 | 40 | 0 | No change |
| Example 91 | Sodium bicarbonate | 7.5 | 60 | 60 | 3 | No change |
| Example 92 | Sodium bicarbonate | 8.0 | 60 | 60 | 0 | No change |
| Example 93 | Sodium hydroxide | 8.5 | 60 | 60 | 0 | No change |
| Example 94 | Sodium bicarbonate | 8.0 | 20 | 60 | 3 | No change |
| Example 95 | Sodium bicarbonate | 8.0 | 80 | 60 | 0 | No change |
| Example 96 | Sodium bicarbonate | 8.0 | 100 | 60 | 0 | No change |

Industrial Applicability

According to the present invention there may be provided cellulose acetate foams with excellent biodegradability and antibacterial properties, as well as good combustibility. The foams therefore have very high industrial value because they provide biodegradable foams which can be used as heat insulating materials, cushioning materials, wall materials, sound absorbing materials and various packaging materials, not only alone but also in the form of molded products.

According to the invention there may also be provided cellulose acetate foams with excellent biodegradability and good combustibility which are also free of acetic acid odor. The foams therefore have very high industrial value because they provide biodegradable foams with no unpleasant acetic acid odor when used as heat insulating materials, cushioning materials, wall materials, sound absorbing materials and various packaging materials, not only alone but also in the form of molded products.

What is claimed is:

1. A biodegradable cellulose acetate foam with a foam cell size of 0.2–0.8 mm and an apparent density of 0.01–0.27 g/cm$^3$.

2. A biodegradable cellulose acetate foam according to claim 1, which is in the form of foam particles with a diameter of 3–200 mm, wherein the ratio of the total surface area to the surface area of the portion of the foam cells with a foam cell size of 0.1 mm or greater exposed at the surface of the said particles is such as satisfies the following inequality
(foam cell exposed surface area/total surface area$> \leq 1/(2+4$ (long axis/short axis)).

3. A biodegradable cellulose acetate foam according to claim 1, which is in the form of a corrugated foam sheet with a thickness t of 1–50 mm, and having a corrugation height h of 2–10 mm and a corrugation width w of 2–10 mm.

4. A biodegradable cellulose acetate foam according to claim 1, which is in the form of a sheet with no surface corrugations and a thickness of 0.5–25 mm, with longitudinal and lateral tensile strengths of 110–900 g/cm and 30–220 g/cm, respectively.

5. A biodegradable cellulose acetate foam which is integrally molded by adhering foam particles according to claim 2 with a binder.

6. A biodegradable cellulose acetate foam prepared by heat shaping a foam sheet according to claim 3.

7. A biodegradable cellulose acetate foam prepared by heat shaping a foam sheet according to claim 4.

8. A biodegradable cellulose acetate foam according to any one of claims 1 to 6 or 7 wherein said foam is treated with a weak alkali solution, for an acetylation degree of 45–60% and no acetic acid odor.

9. A foam according to claim 8, wherein the treatment with a weak alkali solution comprises adding a weak alkali solution with a pH of 7.5–8.5 at 20–100 parts by weight with respect to the foam.

10. A process for producing a biodegradable cellulose acetate foam, which comprises combining a mixed starting material (D) comprising (A) cellulose acetate, (B) a plasticizer and (C) a foam nucleating agent with a weight ratio of (A):(B):(C) of (100):(0–80):(2–50) with water (E) as the foaming agent at a weight ratio of 2–100 with respect to (D), and after melting the mixture (F) at a temperature of 150–250° C., dispensing it at a temperature of 120–220° C. and then extruding it at a shear rate of 1000–20,000 sec$^{-1}$.

11. The process of claim 10, wherein said mixture (F) is melted and extruded, and then the resulting foam is subjected to heat treatment at a temperature of 100–150° C. under a bearing of 5–40 kgf/cm$^2$.

12. The process of claim 10 wherein the plasticizer is a polyalkylene glycol.

13. The process of claim 12 wherein the molecular weight of the polyalkylene glycol is 200–20,000.

14. The process according to claim 10, wherein the foam nucleating agent is talc.

15. The process of any one of claims 10 to 14, wherein said mixture (F) is melted and fused, and then a weak alkali solution with a pH of 7.5–8.5 is added at 20–100 parts by weight with respect to the foam.

* * * * *